United States Patent
Li et al.

(10) Patent No.: US 12,359,999 B2
(45) Date of Patent: Jul. 15, 2025

(54) NON-MODULATED INFRARED SENSOR FOR HANDHELD HALOGEN LEAK DETECTOR AND QUANTITATIVE DETECTION METHOD THEREOF

(71) Applicant: JIANGSU JINGCHUANG ELECTRONICS CO., LTD, Xuzhou (CN)

(72) Inventors: Shuangyun Li, Xuzhou (CN); Chong Lin, Xuzhou (CN); Zhongxiang Tang, Xuzhou (CN); Chaofei Li, Xuzhou (CN)

(73) Assignee: JIANGSU JINGCHUANG ELECTRONICS CO., LTD., Xuzhou (CN)

( * ) Notice: Subject to any disclaimer, the term of this patent is extended or adjusted under 35 U.S.C. 154(b) by 375 days.

(21) Appl. No.: 17/963,186

(22) Filed: Oct. 10, 2022

(65) Prior Publication Data

US 2023/0110457 A1   Apr. 13, 2023

(30) Foreign Application Priority Data

Oct. 11, 2021   (CN) ........................ 202111183044.9

(51) Int. Cl.
    *G01M 3/04*   (2006.01)
(52) U.S. Cl.
    CPC ..................... *G01M 3/04* (2013.01)
(58) Field of Classification Search
    CPC ............ G01M 3/04; G01N 2201/0221; G01N 21/3504
    See application file for complete search history.

(56) References Cited

U.S. PATENT DOCUMENTS

| | | | |
|---|---|---|---|
| 5,650,624 A * | 7/1997 | Wong ................. | G01N 21/3518 250/339.04 |
| 6,791,088 B1 * | 9/2004 | Williams, II .......... | G01N 21/11 250/343 |

(Continued)

FOREIGN PATENT DOCUMENTS

| | | | | |
|---|---|---|---|---|
| EP | 3193166 B1 * | 12/2019 | ................ | G01J 3/42 |
| KR | 101714731 B1 * | 3/2017 | ......... | G01N 21/3504 |

*Primary Examiner* — Francis C Gray
(74) *Attorney, Agent, or Firm* — AGMON LAW PTE LTD (57) ABSTRACT

A non-modulated infrared sensor for a handheld halogen leak detector and a quantitative detection method thereof, the sensor comprising an infrared transmitter, an optical filter, an infrared absorption cell and an infrared receiver, the infrared transmitter and the optical filter being sequentially installed at one end of the infrared absorption cell, and the infrared receiver being installed at the other end of the infrared absorption cell; the infrared absorption cell is composed of a light source chamber, a gas chamber channel and an infrared-receiver chamber that are sealingly connected in sequence, the light source chamber and the infrared-receiver chamber are respectively provided with a gas inlet and a gas outlet, and the gas inlet is communicated with the target gas or the background gas through a solenoid valve; an infrared light source of the single-channel infrared receiver passes through a constant voltage power supply circuit; and the infrared receiver is connected to a single-chip microcomputer control system through an amplification filter module and an analog-digital conversion module, and the single-chip microcomputer control system is in control connection with the solenoid valve. The present invention has a simple structure and can not only locate the leak point quickly, has no blind area and will not miss leak point, but can also detect the amount of gas leakage with more accurate detection results.

6 Claims, 5 Drawing Sheets

(56) References Cited

U.S. PATENT DOCUMENTS

| | | | |
|---|---|---|---|
| 2006/0180763 A1* | 8/2006 | Yoshida | G01N 21/3504 250/343 |
| 2008/0277586 A1* | 11/2008 | Cardinale | G01N 21/3504 250/339.13 |
| 2017/0234761 A1* | 8/2017 | Augusto | G01N 21/3504 250/338.5 |

* cited by examiner

NON-MODULATED INFRARED SENSOR FOR HANDHELD HALOGEN LEAK DETECTOR AND QUANTITATIVE DETECTION METHOD THEREOF

TECHNICAL FIELD

The present invention relates to a sensor for a handheld gas leak detector and a detection method, in particular to a non-modulated infrared sensor for a handheld halogen leak detector and a quantitative detection method thereof.

BACKGROUND ART

At present, the sensor technologies used in handheld (portable) leak detector are mostly heating diode and negative corona discharge technologies, but there are often a series of problems: the heating-diode sensor has the problems of short life and false alarm; the corona sensor has problems such as poor stability, low accuracy, short life, and inability to quantitatively detect gas leakage.

It is well known that infrared technology has existed for many years, but it has not been applied to handheld fixed-point detection of leakage of halogen gas for refrigeration, for the following reasons:

Firstly, the modulated light source of the existing infrared sensor passes through the gas to be detected, and the analyzed gas contains very little refrigerant gas, the absorption of light energy is very small, and the change of the receiver is extremely small, resulting in that a signal-to-noise ratio in the system is not obvious, and the response speed of detection cannot meet the demand;

Secondly, the chopper of the existing infrared sensor consumes a large amount of energy. also increases the complexity of the instrument and reduces the reliability of the instrument. At the same time, chopping also occurs with frequency, so there is a certain blank of time, thus it is also easy to miss the leak point.

SUMMARY OF THE INVENTION

In order to overcome the above-mentioned deficiencies of the prior art, the present invention provides a non-modulated infrared sensor for a handheld halogen leak detector and a quantitative detection method thereof. The sensor has a simple structure and can not only locate the leak point quickly, has no blind area and not miss leak point, but can also detect the amount of gas leakage and obtain more accurate detection results.

The technical solution adopted by the present invention to solve the technical problem is:

A non-modulated infrared sensor for a handheld halogen leak detector, comprising an infrared transmitter, an optical filter, an infrared, absorption cell and an infrared receiver, the infrared transmitter and the optical filter being sequentially installed at one end of the infrared absorption cell, and the infrared receiver being installed at the other end of the infrared absorption cell; the infrared absorption cell is composed of a light source chamber, a gas chamber channel and an infrared-receiver chamber that are sealingly connected in sequence, the light source chamber and the infrared-receiver chamber are respectively provided with a gas inlet and a gas outlet, and the gas inlet is communicated with the target gas or the background gas through a solenoid valve: the infrared transmitter is a single-channel detector; an infrared light source of the infrared receiver passes through a constant voltage power supply circuit; and the infrared receiver is connected to a single-chip microcomputer control system through an amplification filter module and an analog-digital conversion module, and the single-chip microcomputer control system is in control connection with the solenoid valve.

A quantitative detection method based on the non-modulated infrared sensor for a handheld halogen leak detector, comprising the following steps:

1) keeping the infrared light source always on to form a light source signal in the infrared absorption cell;
2) firstly introducing target gas via the gas inlet by switching the solenoid valve in the infrared absorption cell, and collecting 32 groups of data of the target gas in sequence to form acquisition target signal; then introducing background gas through the gas inlet at an interval of 10 seconds, and collecting 32 groups of data of comparison channels in sequence to form acquisition comparison signal;
3) the acquisition of the target signal and the comparison signal in step 2) is performed by the infrared receiver with delay after the switching action of the solenoid valve, and the peak-to-peak values of the target signal and the comparison signal are collected;
4) the target signal and comparison signal collected in step 3) are sequentially filtered and amplified through band-pass filtering and low-pass filtering, and then input into the single-chip microcomputer control system after analog conversion, so as to judge leakage concentration by comparing the difference between the target signal and the comparison signal based on Fourier algorithm and median sliding filtering algorithm.

Compared with the prior art, the present invention provides a non-modulated infrared sensor for a handheld halogen leak detector and a quantitative detection method thereof, wherein the sensor is essentially a single-channel quantitative non-dispersive infrared sensor with simple and innovative structure, which can find the leak point easily and quickly. The infrared receiver detects the change of the light signal in real time as the light source is always on. If the target gas blocks and absorbs the light signal of a specific band, the infrared receiver responds immediately and quickly locates the leak point, it has no blind area and will not miss leak point. At the same time, the utility model adopts a solenoid valve for gas switching to compare the difference between the target gas and the background gas, so as to detect the gas leakage amount. Thus the method can remove the influence of the background interference gas, so that the detection result is more accurate.

BRIEF DESCRIPTION OF DRAWINGS

The present invention will be further described below in conjunction with the accompanying drawings and examples.

FIG. 5a and FIG. 5b are signal curves of concentration of leaked gas according to an example of the present invention, wherein FIG. 5a is the signal curve without detection When the light source is always on, and FIG. 5b is the signal curve with leak point being detected when the light source is always on.

FIGS. 6a, 6b and 6c are the signal curves of concentration of leaked gas of the prior art, wherein

Figure 1:
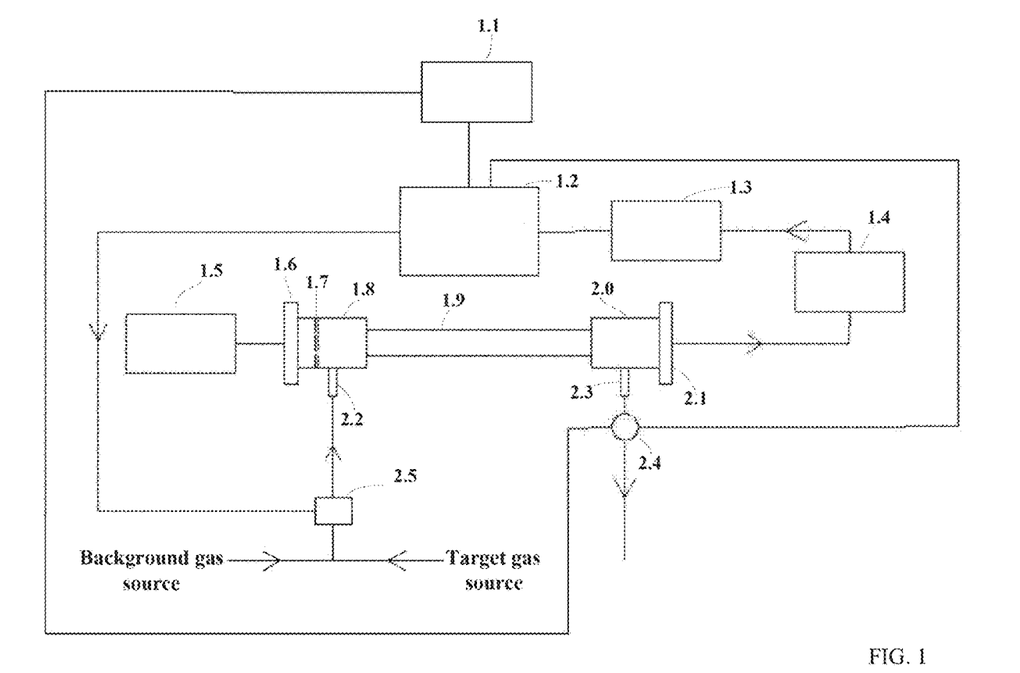
FIG. 1 is a structural block diagram of an example of the present invention.

REFERENCE SIGNS IN FIG.1 product power supply 1.1; single-chip microcomputer control system 1.2; analog-digital conversion module 1.3; amplification filter module 1.4; infrared light source power supply 1.5; infrared transmitter 1.6; optical filter 1.7; light source chamber 1.8; gas chamber channel 1.9; infrared-receiver chamber 2.0; infrared receiver 2.1; gas inlet 2.2; gas outlet 2.3; air pump 2.4; solenoid valve 2.5.

DETAILED DESCRIPTION

In order to make the purposes, technical solutions and advantages of the examples of the present invention more clear, hereunder the technical solutions in the examples of the present invention will be clearly and completely described below with reference to the accompanying drawings of the examples of the present invention. Obviously, the described examples are only some examples of the present invention, and not all the examples. Based on the examples of the present invention, all other examples obtained by those skilled in the art without creative efforts shall fall within the protection scope of the present invention.

Referring to FIG. 1, in a preferred example of the present invention, a non-modulated infrared tensor for a handheld halogen leak detector is provided, which comprises an infrared transmitter, an optical filter an infrared absorption cell and an infrared receiver, the infrared transmitter and the optical filter being sequentially installed at one end of the infrared absorption. cell, and the infrared receiver being installed at the other end of the infrared absorption cell; the infrared absorption cell is composed of a light source chamber, a gas chamber channel and an infrared-receiver chamber that are sealingly connected in sequence, the light source chamber and to the infrared-receiver chamber are respectively provided with a gas inlet and a gas outlet, and the gas inlet is communicated with the target gas or the background gas through a solenoid valve; the infrared receiver is connected to a single-chip microcomputer control system through an amplification filter module and an analog-digital conversion module, and the single-chip microcomputer control system is in control connection with the solenoid valve; an infrared light is source of the infrared transmitter passes through a constant voltage power supply circuit. In this example, the infrared receiver is a single-channel detector, which not only has a simpler structure and high collection efficiency, but is also conducive to further optimizing the size of the gas chamber channel.

As a preferred design solution of this example, the gas chamber channel is a gold-plated copper tube. Further, the gold-plated copper tube has a polished inner wall, which is obtained by polishing. Both ends of the gas chamber channel are sealed, and the inhaled gas flows in the gold-plated copper tube, and the polished inner wall of the gold-plated copper tube enhances its reflection performance, so that the light radiation emitted by the infrared light source reaches the infrared receiver to the greatest extent, ensuring the efficiency and effect of detection.

As another preferred design solution of this example, the cross-sectional dimension of the gas chamber channel is smaller than the cross-sectional dimension of the light source chamber and the infrared-receiver chamber. In this way, the overall shape of the gas chamber channel can be relatively slender. On the one hand, not only the requirements for the design size of the light source chamber and the infrared-receiver chamber can be reduced, but also the product manufacturability can be improved; on the other hand, the longer the gas chamber channel is, the higher the product resolution will be, and it will be easier to detect small leak points. The smaller the cross-section of the gas chamber channel is, the aster the detection response will be, and the time required for the gas concentration to reach equilibrium will be shorter, and the leak points will be found more quickly.

As an improved design of this example, the gas outlet is also connected with an air pump which is connected with the single-chip microcomputer control system, so it is easy to match collection requirement of the infrared receiver analysis requirement of single chip microcomputer system and switching requirement of solenoid valve, to intelligently control the exhaust flow and. maximize the synergistic effect.

Figure 2:
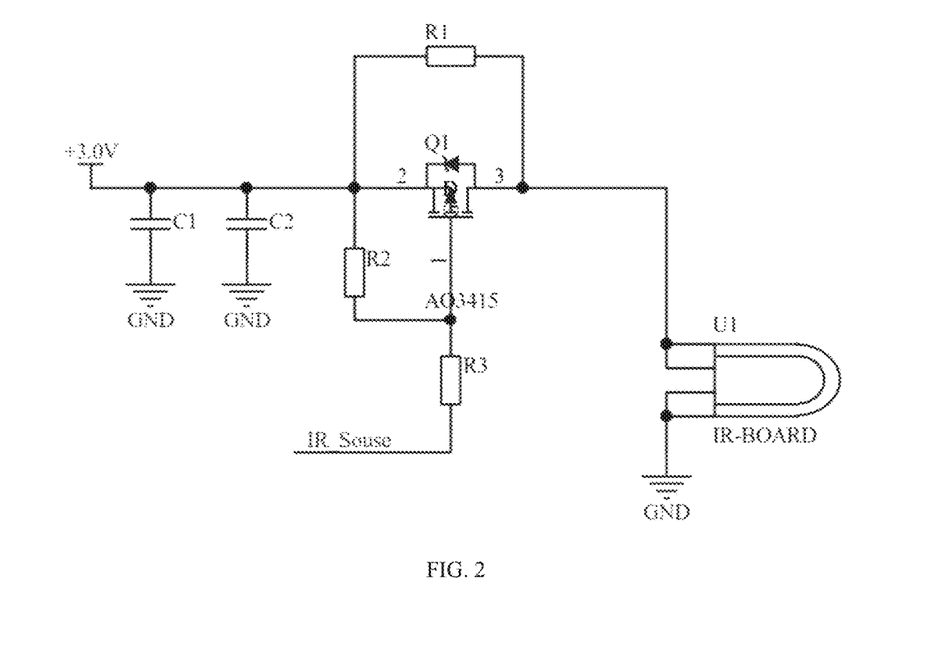
FIG. 2 is a circuit diagram of a soft-start protection circuit in an example of the present invention.

As a further optimized design of this example, a soft-start protection circuit is connected between the infrared light source UI and the constant voltage power supply circuit thereof, and the soft-start protection circuit is further connected with the single-chip microcomputer control system. The soft-start protection circuit can make the infrared light source UI boost in steps to avoid to damage caused by rapid boost, thus the service life is extended, and the light source signal is more stable. Referring to FIG. 2, a more specific solution is that the soft-start protection circuit is mainly composed of a power resistor R1 and a MOS transistor Q1, the power resistor R1 is connected in parallel between the source and the drain of the MOS transistor Q1, and the source and drain of the MOS transistor Q1 are also connected to the output end of the constant voltage power supply circuit is and the input end of the infrared light source UI respectively, and the gate of the MOS transistor Q1 is connected to the control port of the single-chip microcomputer control system. A further optimization and improvement is that a second resistor R2 is also connected between the source and the gate of the MOS transistor Q1, and the gate of the MOS transistor Q1 is connected to the control port of the single-chip microcomputer control system through a third resistor R3 to control the voltage difference between the source and the gate of the MOS transistor Q1 to turn on or off the MOS transistor Q1, where the second resistor R2 and the third resistor R3 belong to the pull-up resistors for avoiding the leakage of electricity of the MOS transistor Q1 when the voltage difference between the source and the gate is too high at the moment of power on; filter capacitors are also provided between the output end of the constant voltage power supply circuit and the source of the MOS transistor Q1, and the number of the filter capacitors can be several, in this example, two filter capacitors are set, namely, the filter capacitor C1 and the filter capacitor C2. When powered on, the MOS transistor Q1 is turned off and the infrared light source UI is connected to the power resistor R1 to achieve preheating, after a set interval, the MOS transistor Q1 is turned on, and the infrared light source reaches the specified power step by step, which plays a protective role.

Figure 3:
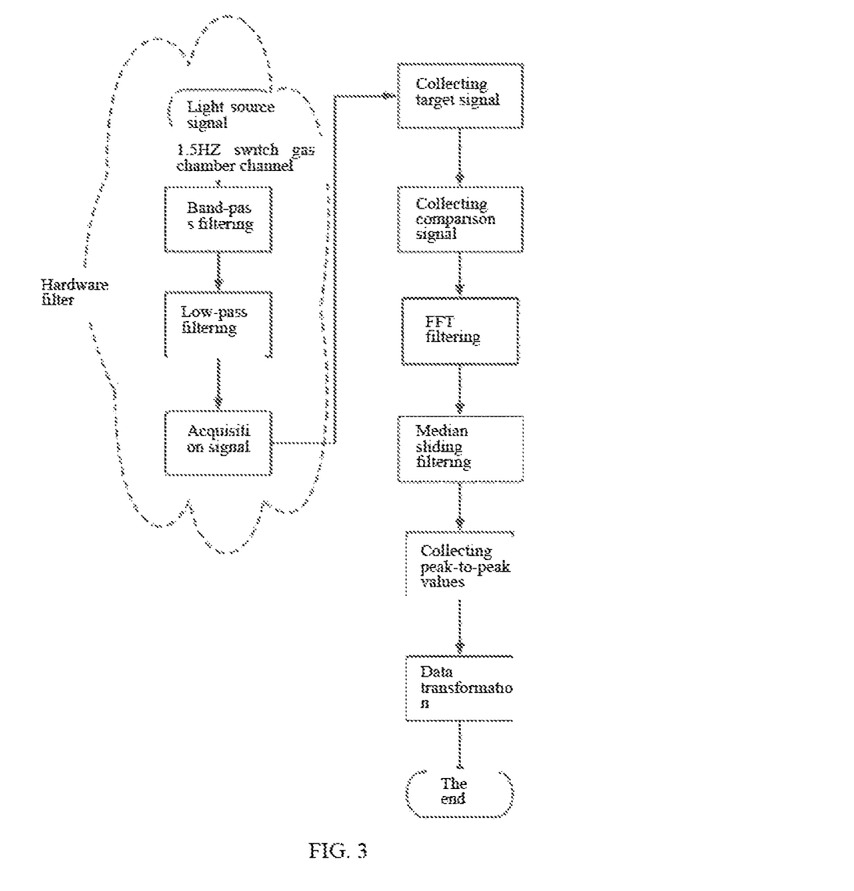
FIG. 3 is a schematic flowchart of a detection method according to an example of the present invention.
Figure 4:
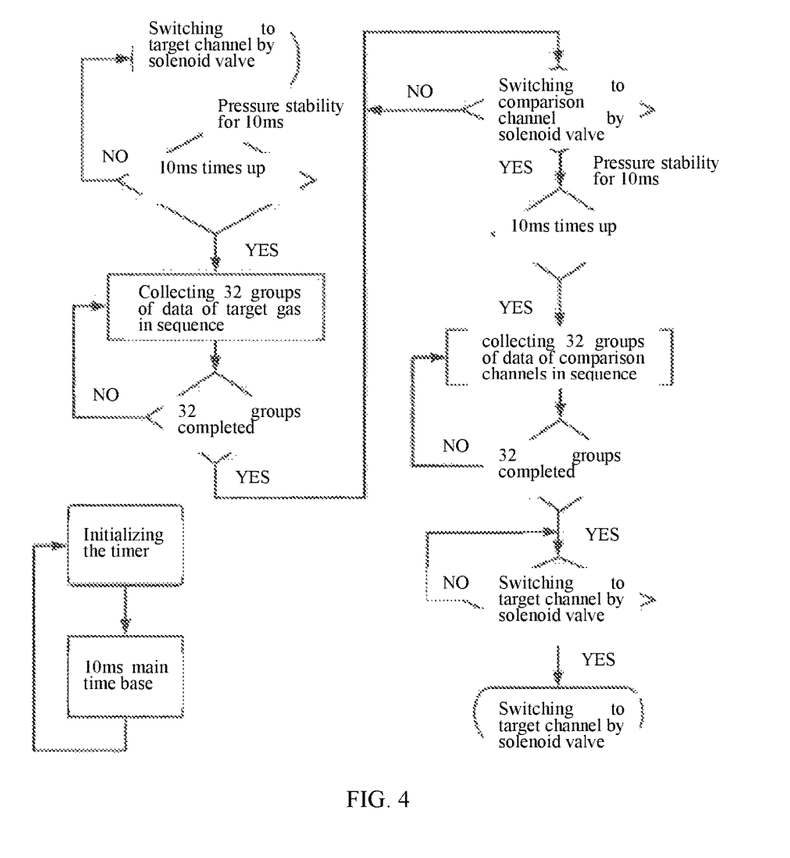
FIG. 4 is a flowchart of switching control of a solenoid valve in a detection method according to an example of the present invention.

Referring to FIG. 3 and FIG. 4, a quantitative detection method based on the non-modulated infrared sensor for a handheld halogen leak detector 1, comprising the following steps:

1) keeping the infrared light source always on to form a light source signal in the infrared absorption cell;
2) firstly introducing, target gas via the gas inlet by switching the solenoid valve in the infrared absorption cell, and collecting 32 groups of data of the target gas in sequence to form acquisition target signal; then introducing background gas through the gas inlet at an interval, and collecting multiple groups of data of comparison channels in sequence to form acquisition comparison signal; wherein the interval is preferably 6.5 seconds, and the main reason for this is that a momentary low pressure will be generated when the solenoid valve switches the gas path, resulting in large data fluctuations, thus the software is easy to interfere the instantaneous abnormal data with normal data, and according to this feature, the interference caused by mechanical reasons can be filtered out; while 32 groups of collected data are generally needed, that is, 32 groups of target gas and 32 to groups of background gas, and 64 groups of data collected in one cycle is a limit data that 24-bit AD can achieve, and it is also the requirement of the present invention to calculate the desired data. according to the fast Fourier algorithm.
3) the acquisition of the target signal and the comparison signal in step 2) is performed by the infrared receiver with delay after the switching action of the solenoid valve, and the peak-to-peak values of the target signal and the comparison signal are collected;
4) the target signal and comparison signal collected in step 3) are sequentially filtered and amplified through band-pass filtering and low-pass filtering, and then input into the single-chip microcomputer control system after analog conversion, so as to judge leakage concentration by comparing the difference between the target signal and the comparison signal based on Fourier algorithm and median sliding filtering algorithm.

FIGS. 5a-5b and FIGS. 6a, 6b, and 6c are the signal curves of the concentration of leaked gas detected by the infrared receiver according to the examples of the present invention and the prior art.

Figure 6A:
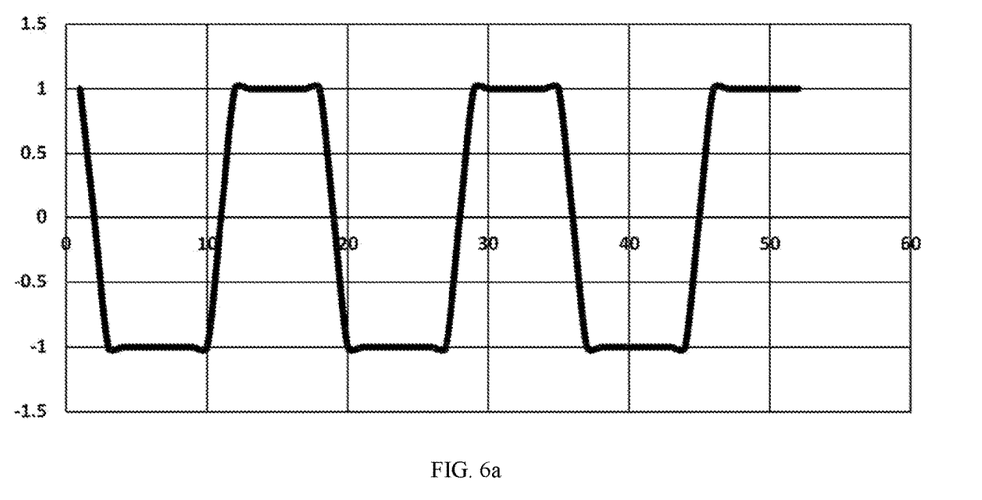
FIG. 6a is the signal curve without detection under the modulation/chopping light source.
Figure 6B:
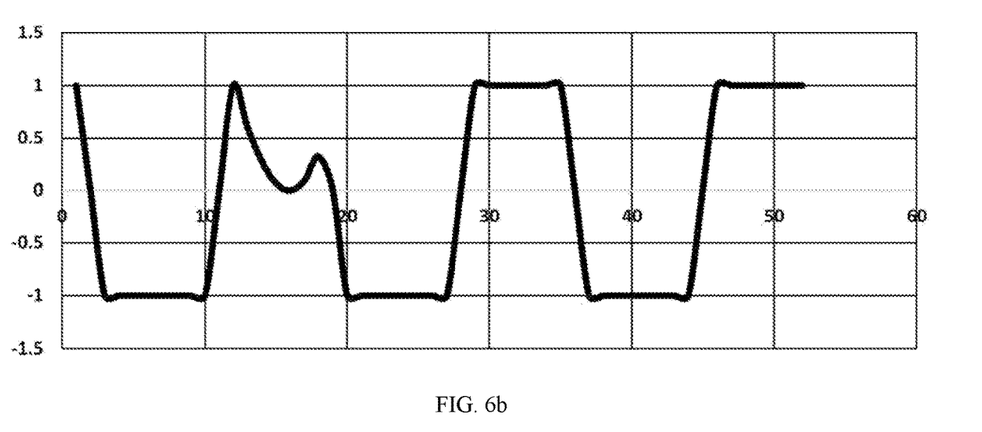
FIG. 6b is signal curve for detection when the brightness of the modulation/chopping light source is max.
Figure 6C:
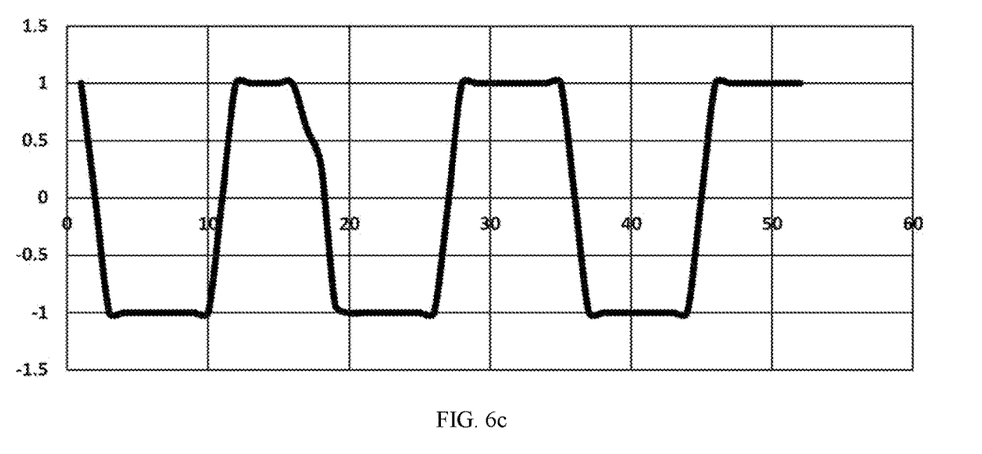
FIG. 6c is the signal curve for detection when the brightness of the modulation/chopping light source becomes weak.

Referring to FIG. 6a, the conventional detection method is the modulation method. The modulation has a steady-state process of the light source. The modulated light source has an intermittent on and off process, and there is a signal when it is on, forming a peak or valley on the graph, and there is no signal When it is off, corresponding to the transition section between the peaks and valleys on the graph. When performing leak point detection, the signal change can only be formed just when the light source is on, but when there is a slight deviation, i.e., when the signal change is small or there is no signal change (see FIGS. 6a, 6c), it is easy to miss the leak point, which is not conducive to the realization of quantitative, accurate and real-time acquisition.

Figure 5A:
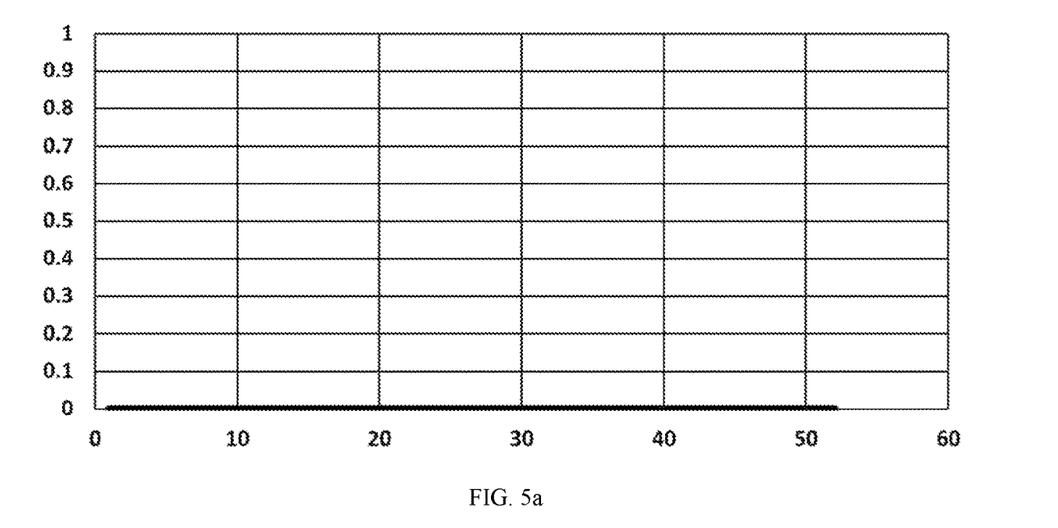
Figure 5B:
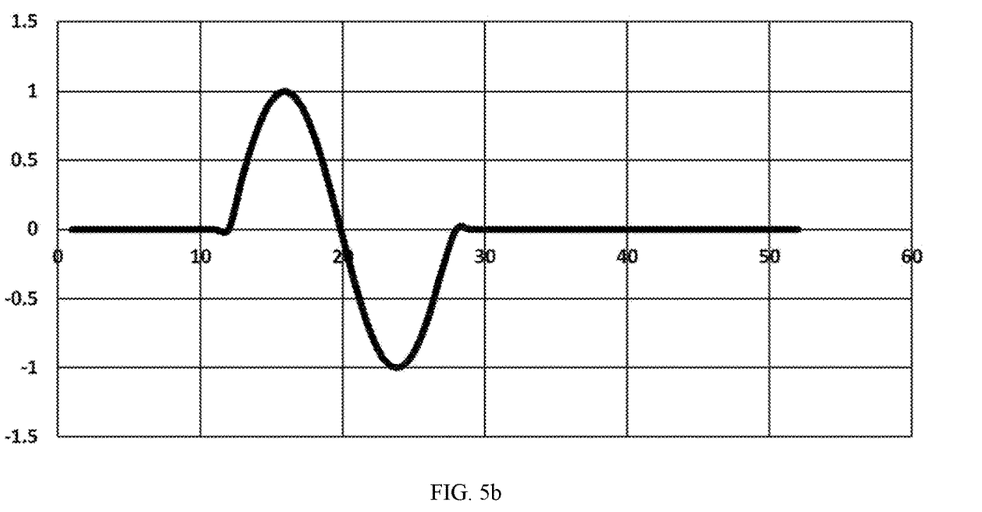

Referring to FIGS. 5a and 5b, when the infrared light source is always on, the signal curve is a straight line that coincides with the abscissa, and the light source signal is continuously stable; when detecting in the always-on state, a complete, clear and obvious sinusoidal signal curve (see FIG. 5b) will be formed instantly when a leak point is encountered. Compared with the shape of the signal curve of the conventional detection, the leak point will not be missed, and the acquisition is performed in real time, which is more convenient for subsequent identification and analysis, making the detection result of leakage value more accurate.

As a further preferred solution, the infrared light source is powered by a lithium battery alone, which is conducive to maintaining a better, stable and always-on effect.

The invention forms an electrical signal Oise according to the shielding of the light source when the target gas (that is, the halogen gas to be measured) is inhaled, and determines the leakage concentration according to the amplitude of the pulse, and this solution has faster response, more efficient leak detection and high accuracy. The infrared light source is always on, which can ensure to that when the leak point is detected, the light source is on, so as to avoid omission, and this feature is very suitable for the rapid detection of gas leakage. At the same time, the present invention uses a solenoid valve to switch the target gas (referring to halogen gas) and the background gas (usually referring to air), and removes the interference of environmental changes according to the difference between the two, so as to achieve accurate and quantitative detection of leakage. However, dining is modulation of the solenoid valve, it will affect the gas pressure in the gas chamber, change the gas flow in the gas chamber, and cause undesired changes in the pyroelectric signal. Gas detection needs to collect the peak-to-peak value of the pyroelectric signal. Both the peak value and the valley value appear behind the switching time of the solenoid valve, and there is a delay. Therefore, the data acquisition is performed with delay after modulation of the solenoid-valve, which can avoid the signal mutation caused by the solenoid valve modulation.

The above are only preferred examples of the present invention, and are not intended to limit the present invention in any form. Any simple modifications and equivalent changes made to the above examples according to the technical essence of the present invention shall fall into the scope of the present invention.

What is claimed is:

1. A non-modulated infrared sensor for a halogen leak detector comprising:
    an infrared absorption cell comprising;
        a light source chamber connected to a first end of a gas chamber channel, the light source chamber having a gas inlet in communication with a target gas or a background gas, the gas inlet having a solenoid valve; and
        an infrared-receiver chamber connected to a second end of the gas chamber channel, the infrared-receiver chamber having a gas outlet;
    an infrared transmitter operably attached to the light source chamber;
    an optical filter disposed between the light source chamber and the infrared transmitter;
    an infrared receiver attached to the infrared-receiver chamber, the infrared receiver configured to send a signal by way of an amplification filter module and an analog-to-digital conversion module;
    a processor configured to receive the signal and further configured to control the solenoid valve.

2. The non-modulated infrared sensor according to claim 1, wherein the gas chamber is a gold-plated copper tube.

3. The non-modulated infrared sensor according to claim 2, wherein the gold-plated copper tube has a polished inner wall.

4. The non-modulated infrared sensor according to claim 1, wherein the cross-sectional dimension of the gas chamber channel is smaller than the cross-sectional dimension of the light source chamber and the infrared-receiver chamber.

5. The non-modulated infrared sensor according to claim 1, wherein the gas outlet is connected to an air pump, and wherein the processor is configured to control the air pump.

6. The non-modulated infrared sensor for a handheld halogen leak detector according to claim 1, wherein the infrared transmitter is configured to transmit an always-on infrared light source signal to the infrared absorption cell.

* * * * *